United States Patent [19]
Inoue et al.

[11] Patent Number: 5,408,415
[45] Date of Patent: Apr. 18, 1995

[54] NAVIGATION SYSTEM FOR MOTOR VEHICLES

[75] Inventors: Nobutaka Inoue, Aichi; Jun Uemura, Nagoya; Shigemitsu Toriyama, Yokkaichi, all of Japan

[73] Assignee: Masprodenkoh Kabushikikaisha, Japan

[21] Appl. No.: 153,420

[22] Filed: Nov. 15, 1993

[30] Foreign Application Priority Data

Nov. 16, 1992 [JP] Japan .................................. 4-305398

[51] Int. Cl.⁶ .............................................. G06F 15/50
[52] U.S. Cl. ..................................... 364/449; 364/444; 340/990; 340/995
[58] Field of Search ....................... 364/443, 444, 449; 73/178 R; 340/988, 990, 995

[56] References Cited

U.S. PATENT DOCUMENTS

| | | | |
|---|---|---|---|
| 4,403,291 | 9/1983 | Von Tomkewitsch | 364/444 |
| 4,550,317 | 10/1985 | Moriyama et al. | 364/449 |
| 4,689,747 | 8/1987 | Kurose et al. | 364/449 |
| 4,796,189 | 1/1989 | Nakayama et al. | 364/449 |
| 4,879,658 | 11/1989 | Takashima et al. | 364/449 |
| 4,882,689 | 11/1989 | Aoki | 364/449 |
| 4,926,336 | 5/1990 | Yamada | 364/444 |
| 4,943,925 | 7/1990 | Moroto et al. | 340/988 |
| 5,067,082 | 11/1991 | Nimura et al. | 340/995 |
| 5,121,326 | 6/1992 | Moroto et al. | 364/449 |
| 5,168,452 | 12/1992 | Yamada et al. | 364/444 |
| 5,184,123 | 2/1993 | Bremer et al. | 364/449 |
| 5,220,507 | 6/1993 | Kirson | 364/444 |
| 5,231,584 | 7/1993 | Nimura et al. | 364/444 |
| 5,272,638 | 12/1993 | Martin et al. | 364/444 |
| 5,274,387 | 12/1993 | Kakihara et al. | 364/449 |

FOREIGN PATENT DOCUMENTS

| | | |
|---|---|---|
| 0158214 | 10/1985 | European Pat. Off. . |
| 0323230 | 5/1989 | European Pat. Off. . |
| 0323246 | 7/1989 | European Pat. Off. . |
| 0348528 | 1/1990 | European Pat. Off. . |
| 0485120 | 5/1992 | European Pat. Off. . |
| 1130299 | 11/1987 | Japan . |
| 1136300 | 11/1987 | Japan . |
| 63188517 | 5/1989 | Japan . |
| 2079453 | 1/1982 | United Kingdom . |
| 211204 | 6/1983 | United Kingdom . |
| 2238870 | 11/1989 | United Kingdom . |
| 92/08952 | 5/1992 | WIPO . |
| 93/09510 | 5/1993 | WIPO . |

Primary Examiner—Gary Chin
Attorney, Agent, or Firm—Davis, Bujold & Streck

[57] ABSTRACT

A navigation system for motor vehicles determines a pie-shaped sector zone for triggering an indication of a route intersection on a displayed road map. The zone is defined by a pie-shaped sector of a circle having the intersection at its center, and provided with a radius determined with respect to the velocity of the vehicle. When the vehicle enters the zone corresponding to the vehicle's velocity, it is determined that the vehicle is approaching the intersection, and a next intersection to be passed by the vehicle is indicated on the road map. The driver can thus be guided along a predetermined route.

14 Claims, 9 Drawing Sheets

FIG. 3

| INTERSECTION ADDRESS | C1 | | C2 | | | C20 | |
|---|---|---|---|---|---|---|---|
| LONGITUDE (x-COORDINATES) | x 1 | | x 2 | | | x 20 | |
| LATITUDE (y-COORDINATES) | y 1 | | y 2 | | | y 20 | |
| ADDRESS OF NEXT INTERSECTION | C2 C7 C11 C1 | | C3 C5 | | | C3 C21 C25 | |
| NODE LIST | N1 N2 | | | | | | |
| REGISTERED INTERSECTION | P1 | | P2 | | | P4 | |

NAVIGATION SYSTEM FOR MOTOR VEHICLES

BACKGROUND OF THE INVENTION

This invention relates to a navigation system for guiding a driver of a motor vehicle when the vehicle approaches an intersection on a predetermined route. More particularly, this invention relates to such a navigation system in which misleading guidance of the driver at an intersection due to erroneous detection of vehicle position is prevented.

A conventional vehicle navigation system is provided with a display screen such as a cathode ray tube CRT, liquid crystal display, or other display means for displaying a road map thereon. The route and the current position of the vehicle are indicated on the displayed road map. When the vehicle approaches an intersection of a predetermined route, the driver is informed by a signal on the screen or by an audible message.

Such a navigation system continually detects the current position of the vehicle and computes the distance between the current position and a next intersection on the predetermined route. When the distance becomes equal to or less than a given value, the system informs the driver that the vehicle is approaching the next intersection. Therefore, if the current position as detected is incorrect due to a detection error, the system may incorrectly inform the driver that the vehicle is approaching the intersection when the vehicle is not actually approaching the intersection.

In this case, since the driver associates the signal with an intersection on the route indicated on the displayed road map, the location or direction in which he perceives the vehicle is heading may be incorrect. Resultantly, the driver may turn right at an intersection where he should actually go straight, or go straight at an intersection where he should turn right, etc.

There is known another type of navigation system by which a driver is informed of the direction to take at the intersection the vehicle is approaching by an audible message. In this type of system, the driver takes, at the intersection, the direction as informed without paying attention to the route indicated on the displayed road map. Accordingly, even if the vehicle is deviating at the intersection from the predetermined route, the driver can recognize the deviation only long after it takes place, resulting in a large deviation from the determined route.

SUMMARY OF THE INVENTION

Wherefore, an object of the present invention is to provide a vehicle navigation system for guiding a driver when the vehicle approaches an intersection, wherein misleading guidance due to erroneous detection of the vehicle position is prevented.

In order to attain the stated objective, the present vehicle navigation system includes display means M1 for displaying a road map, map data storage means M2 for storing map data to provide the road map and a predetermined route to take on the road map, position detecting means M3 for detecting the current position of the vehicle, and display control means M4 for controlling the display means M1 to display a road map according to the map data and for indicating the predetermined route and the current position of vehicle on the displayed road map.

The present vehicle navigation system also includes zoning means M5 for determining, according to the predetermined route and the current position of vehicle, a next intersection on the route, and for determining, according to an approaching course the vehicle takes on the determined route toward the next intersection, an indication trigger sector zone defined by a pie-shaped sector of a circle having the next intersection at its center and a predetermined distance to the next intersection as its radius. The sector also has a predetermined angle between its outer radii, with the approaching course being located midway between the radii dividing the angle in half.

The present vehicle navigation system further includes route intersection guidance means M6 for determining whether the current position of the vehicle is within the indication trigger sector zone, and for indicating, if it is determined that the current vehicle position is within the indication trigger sector zone, the next route intersection on the road map displayed on the display means M1.

In operation, the display control means M4 controls the display means M1 to display a road map according to map data stored in the map data storage means M2. The display control means M4 also cognizably indicates on the displayed road map a predetermined route to be taken stored in the map data storage means M2 and the current position of vehicle detected by the position detecting means M3.

Subsequently, the zoning means M5 first determines a next intersection to be passed by the vehicle according to the predetermined route and the current position of vehicle detected by the position detecting means M3. The zoning means M5 next determines an indication trigger sector zone based on the approaching course the vehicle takes in advancing toward the intersection. The indication trigger sector zone is defined by a pie-shaped sector of a circle having the next intersection at its center and a predetermined distance to the next intersection as its radius. The sector also has a predetermined angle between its outer radii, with the approaching course being located midway the radii dividing the angle in half.

Consequently, the route intersection guidance means M6 determines whether the vehicle is currently within the indication trigger sector zone, and, if it is determined that the vehicle is now within the indication trigger sector zone, cognizably indicates the next route intersection on the road map displayed on the display means Mi. The driver is thus informed that the vehicle is approaching the next route intersection.

A conventional navigation system determines, as the area within which to provide intersection guidance, a circle defined with a next route intersection as its center and a predetermined distance toward the next intersection as radius.

In contrast, the present vehicle navigation system determines a pie-shaped sector having a predetermined angle between its outer radii with the angle divided in half by the approaching course the vehicle takes in advancing toward the intersection. When the vehicle enters the sector zone, indication of the next route intersection is triggered, thereby announcing the driver that the vehicle is approaching the intersection.

BRIEF DESCRIPTION OF THE DRAWINGS

The invention will now be described, by way of example, with reference to the drawings in which:

FIG. 3 is a table displaying intersection data stored in the external storage device;

DETAILED DESCRIPTION OF THE PREFERRED EMBODIMENT

Figure 1:
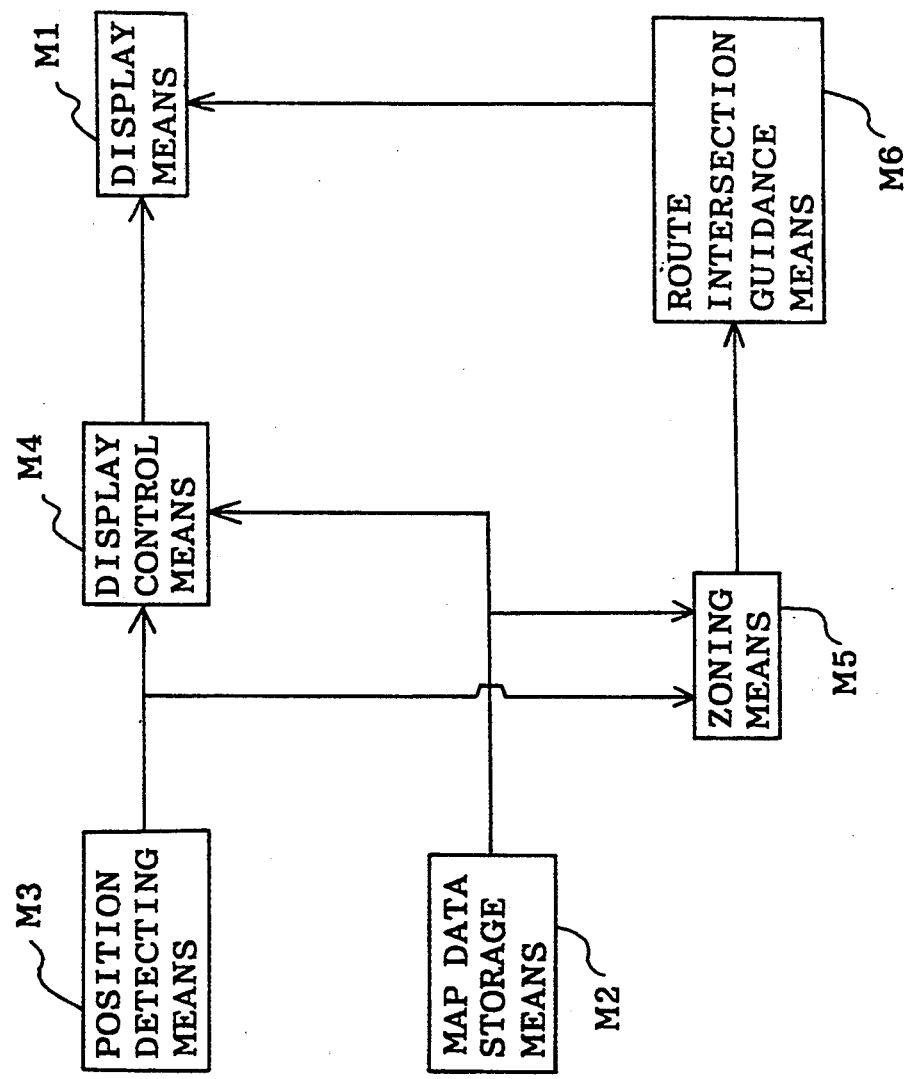
FIG. 1 is a block diagram showing a vehicle navigation system according to the present invention.

An embodiment of the present invention is explained hereunder referring to the drawings although it is understood the other embodiments are within the scope of the present invention.

Figure 2:
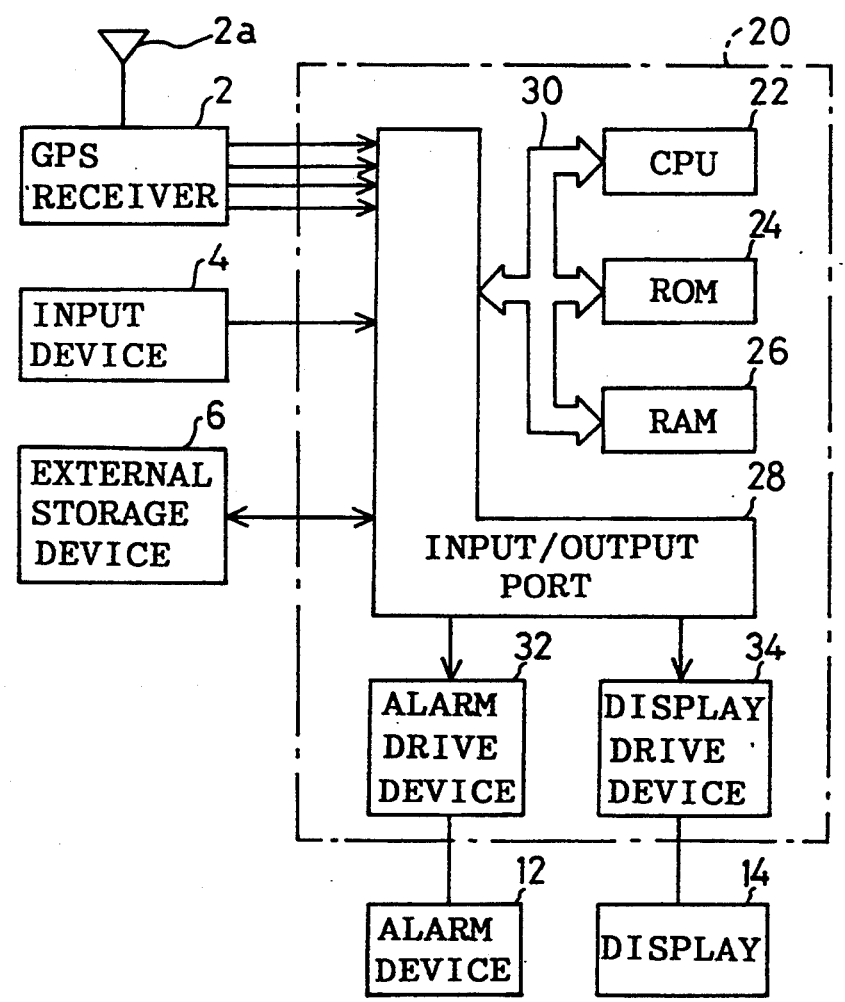
FIG. 2 is a block diagram showing a representative structure of a vehicle navigation system according to the invention.

As shown in FIG. 2, a navigation system according to the present invention includes an antenna 2a and a known GPS receiver 2 that serve as position detecting means M3 for receiving radiation signals transmitted from an artificial satellite as part of the Global Positioning System GPS. The frequency of the received signal is converted and demodulated by the GPS receiver 2 to obtain longitude data, latitude data, and altitude data indicative of the location where the signal is received, i.e. the current position of the vehicle, and the velocity data indicative of the traveling velocity of the receiver, i.e. the driving speed of the vehicle.

The navigation system also includes an input device 4. The input device 4 is provided with a plurality of keys for inputting the route and for switching operation mode between a route input mode, a navigation mode, and other modes.

The navigation system further includes an external storage device 6, alarm device 12, display 14, and a main controller 20. The external storage device 6 corresponds to the map data storage means M2. The alarm device 12 creates a variety of alarms in the form of audible messages to the driver. The display 14 may include a cathode ray tube CRT, a liquid crystal screen, or other display means and displays a road map and other necessary information. The main controller retrieves data from the GPS receiver 2, input device 4, external storage device 6 and other parts of the navigation system, and controls the alarm device 12 and display 14.

The external storage device 6 stores, in addition to the map data to provide a road map to be displayed, intersection data as shown in FIG. 3. The intersection data includes intersection addresses Ci (i: integer value from 1 to n) for each intersection included in the road map. The intersection data also includes longitude (x-coordinate) data and latitude (y-coordinate) data together indicative of the location of each intersection. The intersection data further includes intersection address Ci of the next intersection, and a node list indicative of inflection points Ni between an intersection of interest and a next intersection. During the route input mode, intersections on a predetermined route are consecutively registered and stored as registered intersections Pi.

The main controller 20 is a known microcomputer including a CPU 22, a ROM 24, a RAM 26, an input/output port 28, and a bus line 30 connecting these components. The main controller 20 is provided with an alarm drive (control) device 32 and display drive device 34 via which the main controller 20 activates the alarm device 12 and the display 14.

During the route input mode, each intersection is designated as a route intersection by being input through the input device 4 and is stored by the main controller 20 as a registered intersection Pi. The main controller 20 thus performs the route input process by storing a route to be taken in the external storage device 6.

Figure 4:
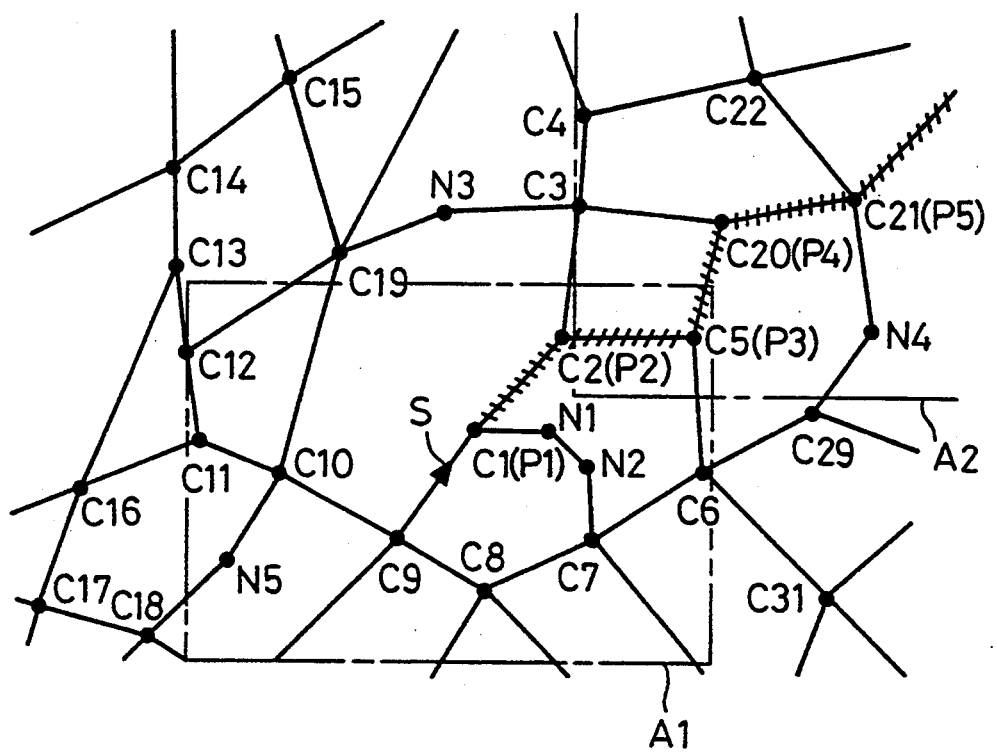
FIG. 4 is an illustration showing how a road map is displayed on the display device.

When the navigation system is set in navigation mode, the map data is retrieved from the external storage device 6 with the current vehicle position at its center. According to the map data retrieved, a road map of corresponding area, shown exemplarily in FIG. 4 as area A1, is displayed on the display 14. The current vehicle position S and a route, represented by a line crossed with slashes in the figure, are indicated on the display 14. The main controller 20 thus serves as the display control means, and then effects the navigation process shown in FIGS. 5A through 7.

When the GPS receiver 2 determines the current position and advancing direction of the vehicle, a red arrow is marked on the displayed road map at a location and pointing in a direction corresponding to the determined position and direction. If the GPS receiver 2 cannot specify the advancing direction of the vehicle, a black dot is marked on the road map. The route is indicated by accentuating the corresponding road with different colors.

Figure 5A:
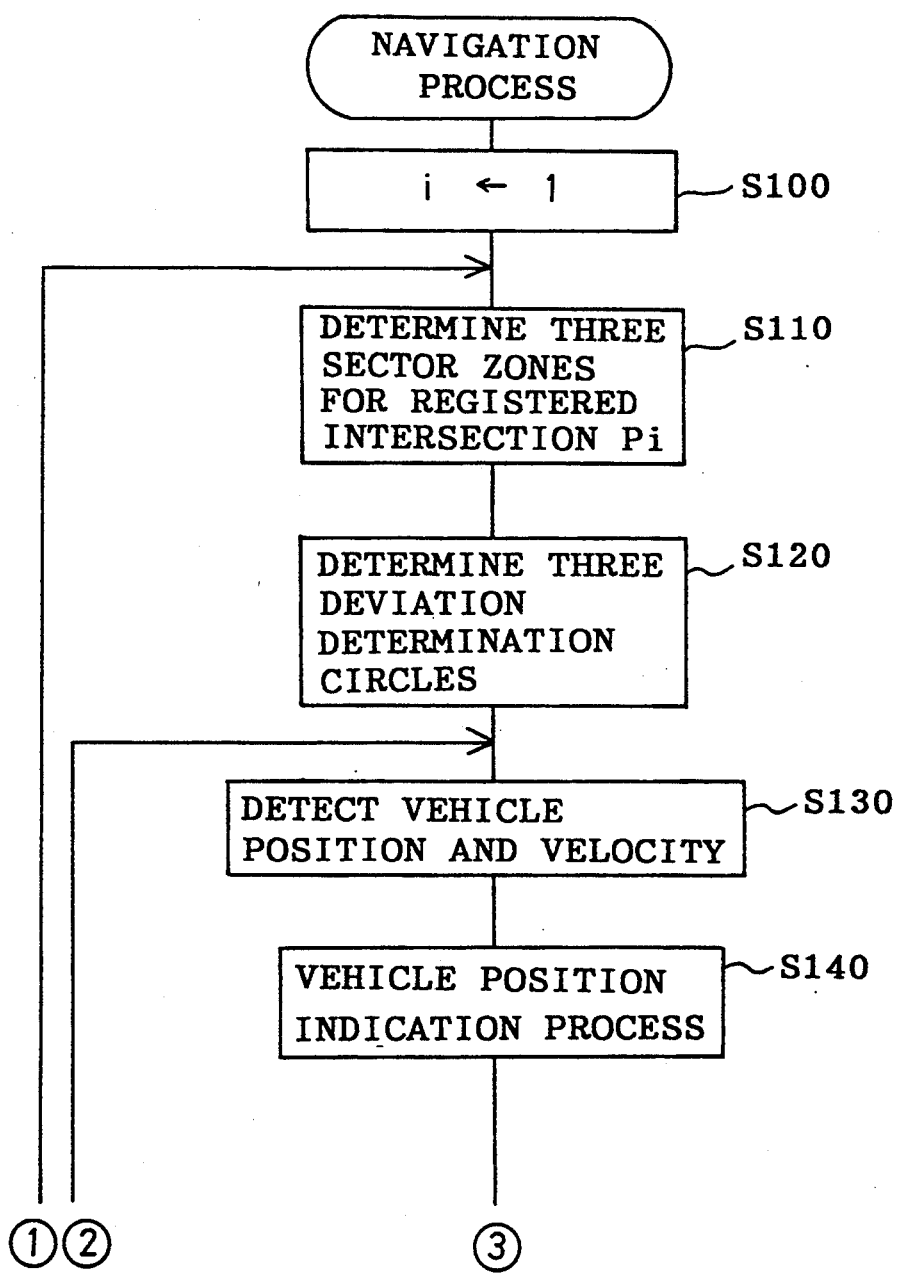
FIGS. 5A and 5B together are a flowchart showing the navigation process executed by a controller.
Figure 5B:
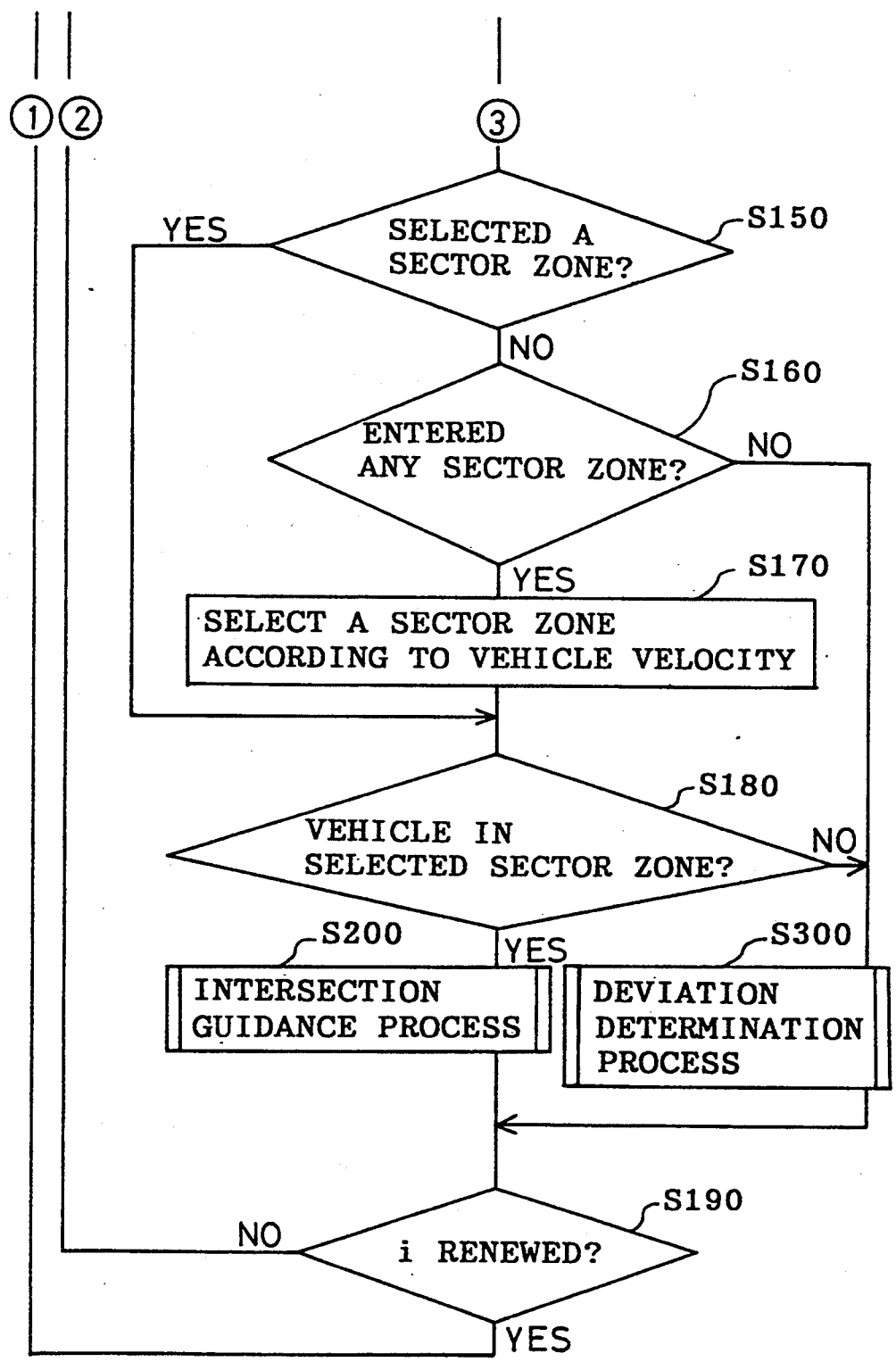

As shown in FIG. 5A, when the navigation mode is selected, the counter value i, indicative of the sequence in which the registered intersections Pi are to be passed, is set at an initial value of "1" indicative of the starting point of the route, step S100.

At the next step S110, the indication trigger sector zone is determined. The indication trigger sector zone is provided for determining when a registered intersection Pi, corresponding to the counter value i, is to be flashed on the displayed road map as the vehicle approaches the registered intersection Pi and enters the indication trigger sector zone. The process at step S110 thus serves as zoning means M5.

The indication trigger sector zone is determined by defining a pie-shaped sector of a circle having the registered intersection Pi at its center and a predetermined distance from the center as its radius. The sector covers a predetermined angle around the apex or center and is divided in half by a line defined by the approaching course of the vehicle. Specifically, the main controller 20 has pattern data from which the indication trigger sector zone is obtained at the step S110 through coordinate transformation based on the coordinates of the registered intersection Pi and the approaching course.

Figure 8:
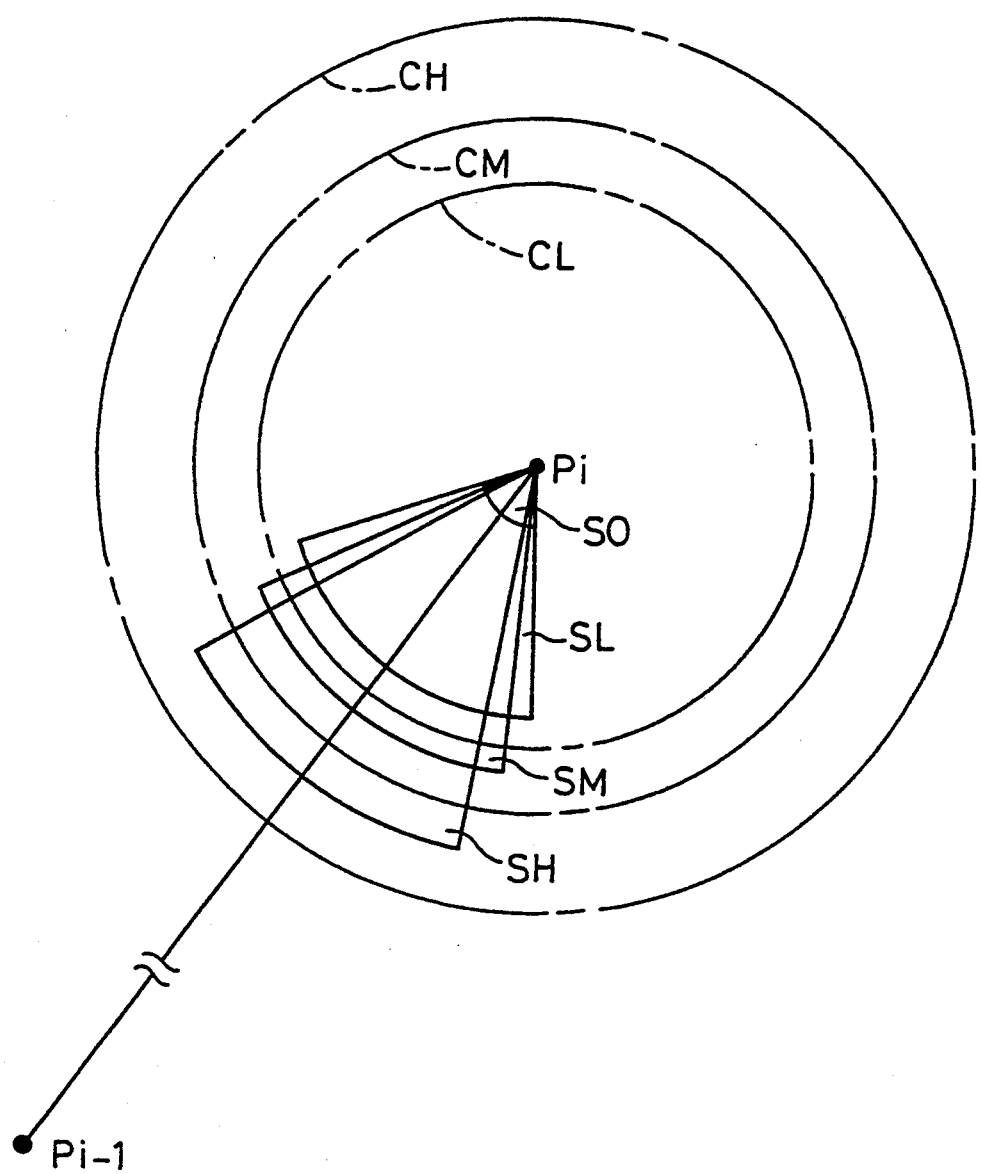
FIG. 8 is an illustration of the indication trigger sector zones and deviation determination circles determined for a registered intersection Pi.

The pattern data in the main controller 20 is comprised of three pie-shaped pattern data that are classified into a low velocity of 40 km/h (24.85 mph) or less, a medium velocity of over 40 km/h (24.85 mph) and under 90 km/h (55.9 mph), and a high velocity of over 90 km/h (55.9 mph) with respect to the velocity of vehicle. Three indication trigger sector zones are thus prepared from the pattern data at the step S110. Specifically, a low velocity sector zone SL, a medium velocity sector zone SM, and a high velocity sector zone SH shown in FIG. 8 are determined.

In the instant embodiment, the distance between the arc and the registered intersection Pi of the low velocity sector zone SL, the medium velocity sector zone SM, and the high velocity sector zone SH are determined to be substantially 160 m (525 Ft), 200 m (656 Ft), and 250 m (820 Ft), respectively. The angle or length of the sector around its center is determined such that the distance between the two ends of the chord of the arc is substantially 200 m. The distance between the arc and the registered intersection Pi is hereinafter referred to as the approach determination distance.

The approaching course referred to in the instant description is an imaginary straight line between registered intersection Pi and registered intersection $Pi_{-1}$ or node $Ni_{-1}$ located immediately before the intersection Pi.

After the three sector zones SL, SM, and SH are determined at step S110, the process step goes to step S120 to determine three deviation determination circles for the registered intersection Pi. The deviation determination circles are provided for determining whether the vehicle has not passed the registered intersection Pi, i.e. the vehicle is deviating from the route. Similarly to determination of sector zones, the deviation determination circles are obtained through coordinate transformation of pattern data previously prepared and stored in the main controller 20. As shown in FIG. 8, the deviation determination circles are provided with respect to vehicle velocity and classified into three categories. Specifically, a low velocity deviation determination circle CL, a medium velocity deviation determination circle CM, and a high velocity deviation determination circle CH are obtained with their radii being a little larger than the approach determination distance of the low velocity sector zone SL, the medium velocity sector zone SM, and the high velocity sector zone SH, respectively.

At step S130, the current position and velocity of the vehicle are detected by the GPS receiver 2. At the next step S140, according to the detected value, the position indication process is performed to renew the indication of vehicle position and advancing direction currently displayed on the display 14.

At the position indication process, not only the vehicle position detected most currently is indicated on the road map, but the road map is changed if the new vehicle position is beyond a given area on the screen. The road map is changed, from area A1 to area A2 of FIG. 4 for instance, such that the new vehicle position is located symmetrical in relation to the former one with respect to the center of the screen.

At step S150, it is determined whether a proper sector zone has been selected at step S170, described later, for registered intersection Pi from among the three sector zones SL, SM, and SH. If "NO" is determined, the flow goes to step S160 to determine, according to the vehicle position detected most currently at step S130 and the sector zones SL, SM, and SH determined at step S110, whether the vehicle has entered any of the sector zones SL, SM, and SH.

If "YES" is determined at step S160, a proper sector zone is selected, step S170, from among the three sector zones SL, SM, and SH according to the vehicle velocity detected most currently at step S130. Thus, if the vehicle velocity is 40 km/h (24.85 mph) or less, the low velocity sector zone SL is selected. Likewise, if the vehicle velocity is over 40 km/h (24.85 mph) and under 90 km/h (55.9 mph), the medium velocity sector zone SM is selected, and if the vehicle velocity is over 90 km/h (55.9 mph), the high velocity sector zone SH is selected.

After a sector zone is selected at step S170 or after it is determined at step S150 that a sector zone has been selected, the flow goes to step S180 to determine, based on the vehicle position most currently detected at step S130 and the selected sector zone, whether the vehicle has entered the selected sector zone. If it is determined that the vehicle has entered the selected sector zone, the flow goes to step S200 to cause a flashing indication of the registered intersection Pi. The process at step S200 thus corresponds to the route intersection guidance means to perform the intersection guidance process.

On the other hand, if it is determined at step S160 that the vehicle has not entered any of the sector zones SL, SM, and SH, or if it is determined at step S180 that the vehicle has not entered the selected sector zone, the process step goes to step S300 as deviation determination process to determine whether the vehicle is deviating from a predetermined route to take.

As a result of completion of the intersection guidance process at step S200 or the deviation determination process at step S300, it is now determined that the vehicle has passed the registered intersection Pi, and the flow goes to step S190. At step S190, it is determined whether the counter value for i of the registered intersection Pi is renewed to one indicating the next registered intersection $Pi_{+1}$. If "YES" is determined at step S190, the flow goes to step S110. If "NO" is determined at step S190, the flow goes to step S130.

Figure 6:
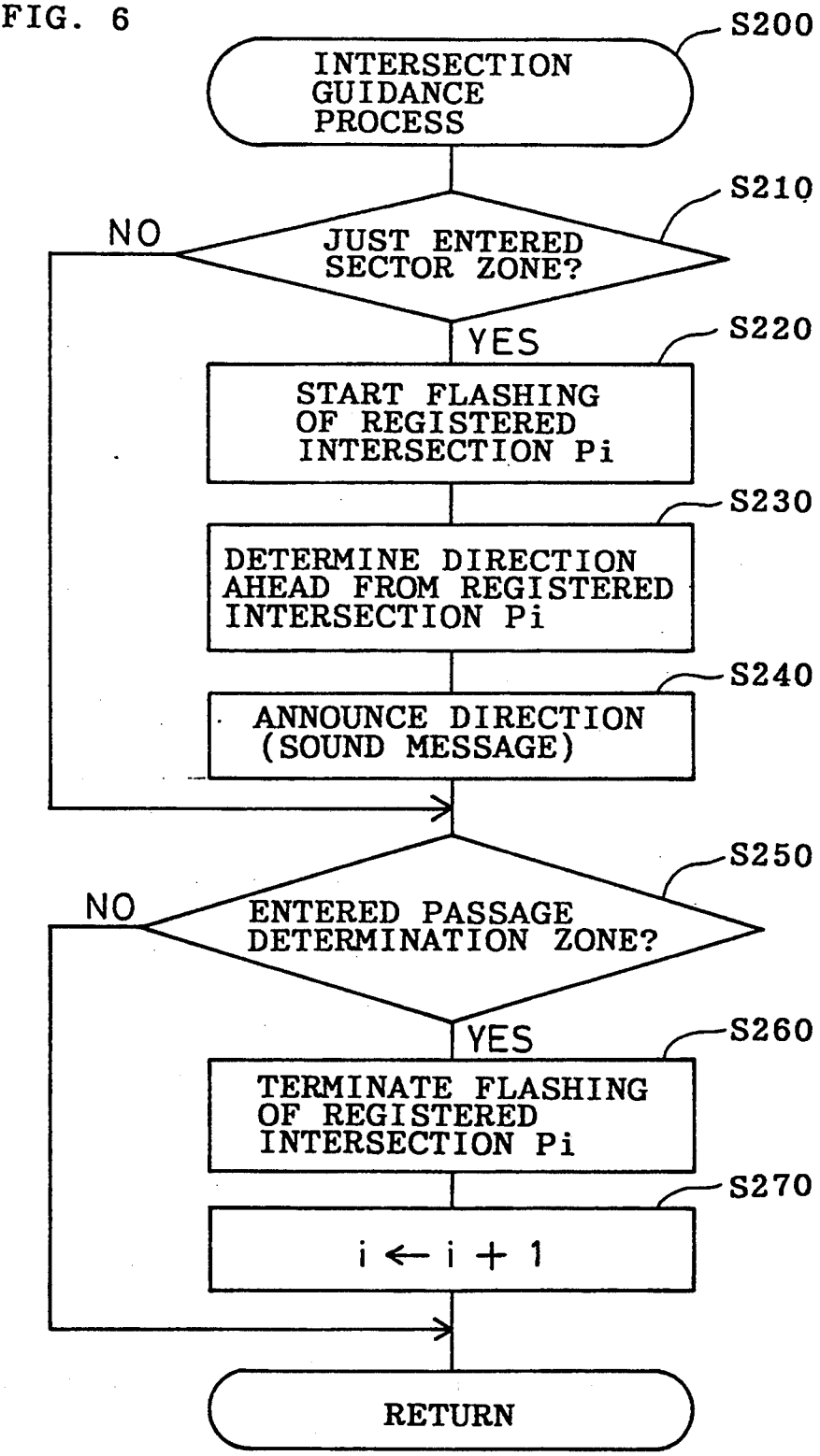
FIG. 6 is a flowchart showing the intersection guidance process effected at step S200 of the navigation process.

The process at step S200 is shown in FIG. 6 and explained in detail hereafter.

At step S210, it is determined whether entrance of the vehicle into the selected sector zone has just occurred. If "YES" is determined at step S210, the flow proceeds to step S220 to cause a flashing indication of the registered intersection Pi on the road map displayed on the display 14. The flow then proceeds to step S230 to determine the advancing direction of the vehicle, i.e. going straight, turning right, or turning left, from the registered intersection Pi to the next registered intersection $Pi+1$. At the next step S240, the alarm device 12 is caused to announce the determined advancing direction by an audible message, such as "Turn right at the next intersection", thereby guiding the driver to advance toward the registered intersection Pi.

The registered intersection Pi is indicated by alternately flashing a yellow and blue colored indication.

The advancing direction from the registered intersection Pi toward the next registered intersection $Pi_{+1}$ is obtained by the following method.

First, a straight line between the registered intersection Pi and the next registered intersection $Pi_{+1}$ or an intermediating node closest to the registered intersection Pi is assumed. The straight line is defined as an exiting course of the vehicle in leaving the registered intersection Pi. If the exiting course lies slanting to the right in relation to the approaching course obtained in determining a sector zone at step S110 for the registered intersection Pi, the advancing direction is determined to be a "right turn". If the exiting course lies slanting to the left in relation to the approaching course, the advancing direction is determined to be a "left turn". In other cases, the advancing direction is determined to be "going straight".

If, at step S210, it is determined that the vehicle has entered the selected sector zone, or when the processes at steps S220-S240 are finished, the flow goes to step S250. At step S250, it is determined whether the vehicle has entered the passage determination zone SO, shown in FIG. 8, included within the selected sector zone. As shown in FIG. 8, the passage determination sector zone SO is a smaller pie-shaped area defined by an arc having a predetermined distance, that is 30 m (98.4 Ft) in the instant embodiment, from the registered intersection Pi.

If it is determined at step S250 that the vehicle has entered the passage determination zone SO, the flow goes to step S260, thereby terminating the flashing indication of the registered intersection Pi. At the next step S270, the counter value of i is incremented, and the instant intersection guidance process is finished. If "NO" is determined at step S250, the instant intersection guidance process is also finished.

Figure 7:
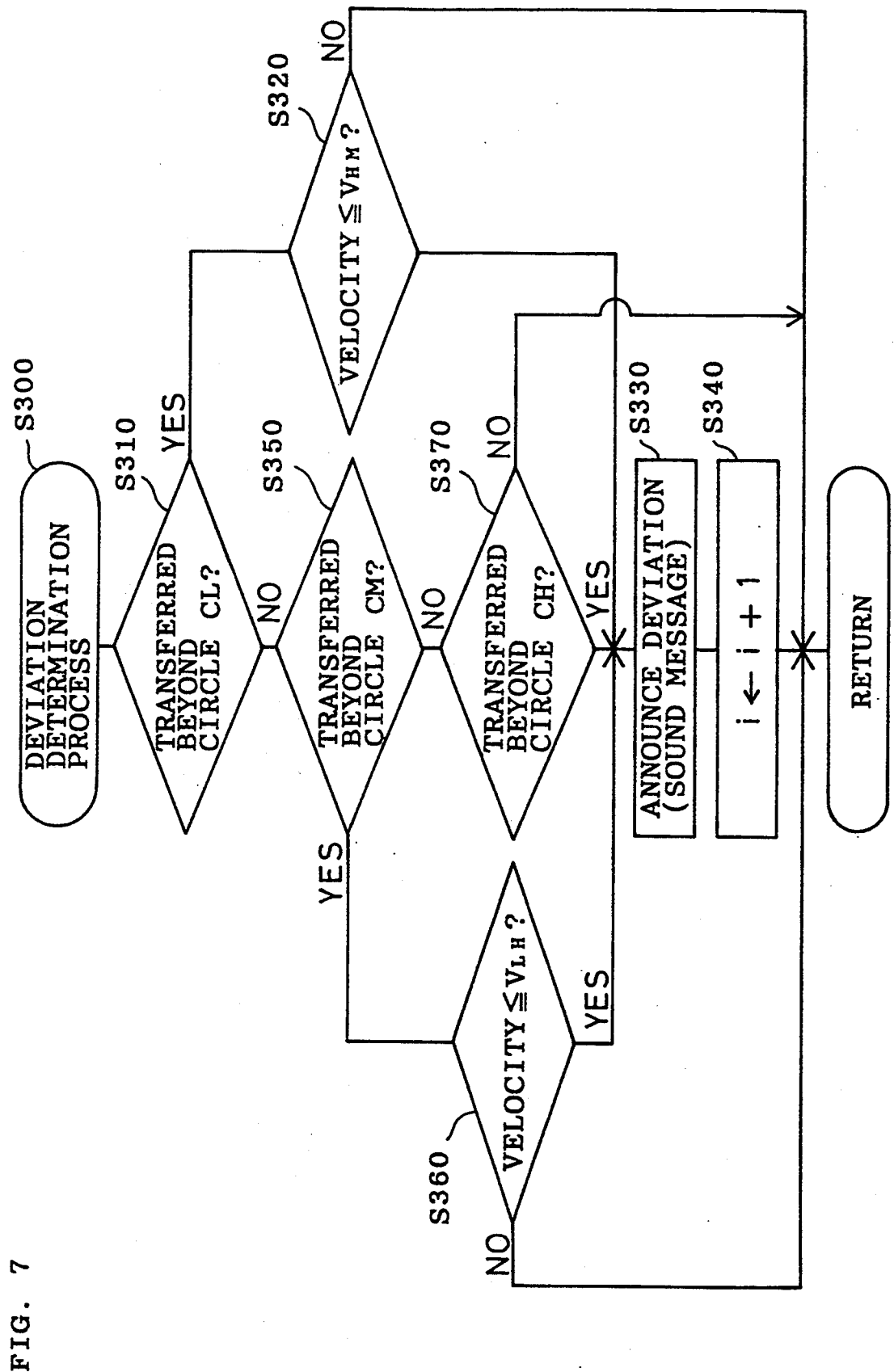
FIG. 7 is a flowchart showing the deviation determination process effected at step S300 of the navigation process.

The deviation determination process effected at step S300 is shown in FIG. 7 and explained hereafter in detail.

First, at step S310, it is determined whether the vehicle has traveled out of the low velocity deviation determination circle CL. If "YES" is determined at step S310, the flow goes to step S320 to determine whether the vehicle's velocity is under the lower velocity limit $V_{L\ M}$ of 40 km/h. Specifically, it is determined at this step whether the current vehicle velocity is low velocity. If it is determined that the vehicle velocity is low velocity, it is determined that the vehicle is deviating from the route to take, and the flow goes to step S330. At step S330, the deviation is announced to the driver by an audible message.

Thus, when the vehicle, after entering the low velocity deviation determination circle CL encircling the registered intersection Pi, does not subsequently enter the passage determination zone SO and travels in low velocity out of the low velocity deviation determination circle CL, it is determined that the vehicle is deviating, and the driver is informed of the deviation.

In the instant embodiment, announcement of "deviation occurred" is provided three times as an audible message while the registered intersection Pi is flashed on the displayed road map. The driver is thus reported of the deviation.

Following step S330, on the assumption that the guidance of the registered intersection Pi is no longer necessary, the counter value of i is incremented, step S340, and the deviation determination process ends.

On the other hand, if it is determined at step S310 that the vehicle has not traveled out of the low velocity deviation determination circle CL, it is next determined at step S350 whether the vehicle has traveled out of the medium velocity deviation determination circle CM. If "YES" is determined at step S350, the flow goes to step S360. At step S360, it is determined whether the current vehicle velocity is under the higher velocity limit $V_{MH}$ of 90 km/h. Specifically, it is determined at this step whether the vehicle velocity is medium velocity. If "YES" is determined at step S360, it is determined that the vehicle is deviating from the route to take. Next, the process at steps S330 and S340 is performed, and the instant deviation determination process ends.

Thus, when the vehicle, after entering the medium velocity deviation determination circle CM encircling the registered intersection Pi, does not subsequently enter the passage determination zone SO and travels in low or medium velocity out of the medium velocity deviation determination circle CM, it is determined that the vehicle is deviating, the driver is informed of the deviation, the counter value of i is incremented, and the instant process ends.

On the other hand, if it is determined at step S350 that the vehicle has not traveled out of the medium velocity deviation determination circle CM, it is next determined at step S370 whether the vehicle has traveled out of the high velocity deviation determination circle CH. If "YES" is determined at step S370, the process at steps S330 and S340 is performed, and the instant deviation determination process ends.

Thus, when the vehicle, after entering the high velocity deviation determination circle CH encircling the registered intersection Pi, does not subsequently enter the passage determination zone SO and travels out of the high velocity deviation determination circle CH, it is determined that the vehicle is deviating, the driver is informed of the deviation, the counter value of i is incremented, and the instant process ends.

When it is determined at step S320 or S360 that the velocity of a vehicle traveling out of the low velocity deviation determination circle CL or out of medium velocity deviation determination circle CM is not under the lower velocity limit VLM or higher velocity limit $V_{M\ H}$, respectively, or when it is determined at step S370 that the vehicle has not traveled out of the high velocity deviation determination circle CH, the instant deviation determination process ends.

Thus, according to the present invention, a pie-shaped sector zone is provided for a registered intersection Pi on route. The orientation of the pie-shaped sector zone is determined according to the approaching course of the vehicle, and defined as the zone within which to trigger indication of the registered intersection Pi. When the vehicle enters the sector zone, it is determined that the vehicle is now approaching the registered intersection Pi, and immediately after entrance of the vehicle, the driver is informed by an audible message of the proper direction to take at the registered intersection Pi. The registered intersection Pi is flashed on the road map displayed on the display 14 until the vehicle enters the passage determination zone included in the sector zone, or goes beyond the sector zone.

In prior art navigation systems, the fact that the vehicle is approaching a route intersection is detected when the distance between the current vehicle position and the route intersection becomes a predetermined value. In comparison, even when the GPS receiver 2 is under unfavorable conditions, the present vehicle navigation system is substantially relieved of misleading announcements of approach to a registered intersection Pi due to error in detecting the vehicle's position.

The vehicle navigation system of the preferred embodiment determines three sector zones that vary in size with respect to the vehicle velocity, and selects one of them for controlling indication. Although, it can be appreciated that any number of sector zones may be employed. Therefore, the higher the velocity of the vehicle, the sooner the driver is informed of the registered intersection Pi ahead.

Specifically, if only one kind of indication trigger sector zone is provided regardless of vehicle velocity, the vehicle running at a higher velocity has a shorter time from announcement of registered intersection Pi to arrival at the registered intersection Pi. As a result, in many cases the driver has to swiftly slow down the vehicle and change lanes right in front of the registered intersection Pi.

According to the present navigation system, the driver can safely change lanes, if required, regardless of the vehicle velocity. Safety in driving is thus assured.

Further, in the present navigation system, the deviation determination circle is determined with its center at the registered intersection Pi that the vehicle is to pass next. If the vehicle travels out of the deviation determination circle without entering the passage determination zone SO, it is determined that the vehicle is deviating from the route to be taken. The driver is informed of the deviation by an audible message, and can take a proper route.

Wherefore, having described the present invention, what is claimed is:

1. A vehicle navigation system including display means for displaying a road map, map data storage means for storing map data to provide the road map and a predetermined route to be taken on the road map, position detecting means for detecting a current position of a vehicle, and display control means for controlling said display means to display the road map according to the map data and for indicating the predetermined route and the current position of the vehicle on the road map displayed, wherein said vehicle navigation system further includes:

zoning means for determining, according to the predetermined route and the current position of vehicle, a next intersection on the route to be taken, and for determining, according to a course of the vehicle as the vehicle approaches the next intersection, an indication trigger sector zone defined by a sector of a circle having the next intersection as its center and having a predetermined distance to the next intersection as the sector's radius, with the approach course of the vehicle, as the vehicle approaches the next intersection, dividing the sector into two substantially equal portions; and route intersection guidance means for determining whether the current position of the vehicle is within the indication trigger sector zone, and for indicating, on the displayed road map of said display means, if the route intersection guidance means determines that the current vehicle position is within the indication trigger sector zone, the next intersection on the route to be taken.

2. A navigation system according to claim 1, wherein said position detecting means further comprises a receiver, having an antenna connected therewith, for receiving a transmission signal from a satellite for determining the current position of the vehicle.

3. A navigation system according to claim 1, where said display means is one of a cathode ray tube and a liquid crystal screen.

4. A navigation system according to claim 1, wherein said navigation system further comprises a main controller communicating with said display control means for displaying information processed by said main controller.

5. A navigation system according to claim 1, wherein said main controller communicates with an alarm control device which, in turn, communicates with an alarm device and said alarm device is actuated when the route intersection guidance means determines that the vehicle's current position is within the indication trigger sector zone.

6. A vehicle navigation system according to claim 1, wherein said zoning means determines a low velocity sector zone, a medium velocity sector zone and a high velocity sector zone, with each sector zone having the next intersection at its center; and the medium velocity sector zone has a first predetermined distance as its radius, said high velocity sector zone has a greater predetermined distance as its radius than the predetermined distance of the medium velocity sector zone, and the low velocity sector zone has a smaller predetermined distance as its radius than the predetermined distance of the medium velocity sector zone.

7. A navigation system according to claim 6, wherein the radii of the low velocity sector zone, the medium velocity sector zone and the high velocity sector zone are approximately 160 meters, 200 meters, and 250 meters, respectively.

8. A navigation system according to claim 1, wherein said system further includes deviation determination means for determining at least one deviation determination circle having the next intersection at its center, and for determining when the vehicle deviates from the route to be taken and generating an alarm upon determination of vehicle deviation.

9. A vehicle navigation system according to claim 8, wherein the radius of the deviation determination circle depends upon the current vehicle velocity.

10. A vehicle navigation system according to claim 1, wherein the route intersection guidance means further comprises a passage determination zone having a radius extending a predetermined distance away from the next route intersection along the vehicle approach course.

11. A vehicle navigation system according to claim 10, wherein the radius of the passage determination zone is approximately 30 meters.

12. A vehicle navigation system according to claim 10, wherein said system further includes an alarm device for indicating when the vehicle enters the sector zone.

13. A vehicle navigation system according to claim 10, wherein said system further includes an alarm device for indicating that the vehicle did not enter the sector zone.

14. A method of navigating a vehicle with a system including display means for displaying a road map, map data storage means for storing map data to provide the road map and a predetermined route to be taken on the road map, position detecting means for detecting a current position of a vehicle, and display control means for controlling said display means to display the road map according to the map data and for indicating the predetermined route and the current position of the vehicle on the road map displayed, said method comprising the steps of:

determining, with zoning means according to the predetermined route and the current position of vehicle, a next intersection on the route to be taken, determining, according to a course of the vehicle as the vehicle approached the next intersection, an indication trigger sector zone defined by a sector of a circle having the next intersection at its center and having a predetermined distance to the next intersection as the sector's radius, with the approach course of the vehicle, as the vehicle approaches the next intersection, dividing the sector into two substantially equal portions, determining, with route intersection guidance means, whether the current position of vehicle is within the indication trigger sector zone, and indicating on the displayed road map of said display means, if the route intersection guidance means determines that the current vehicle position is within the indication trigger sector zone, the next intersection on the route to be taken.

* * * * *